No. 733,060. Patented July 7, 1903.

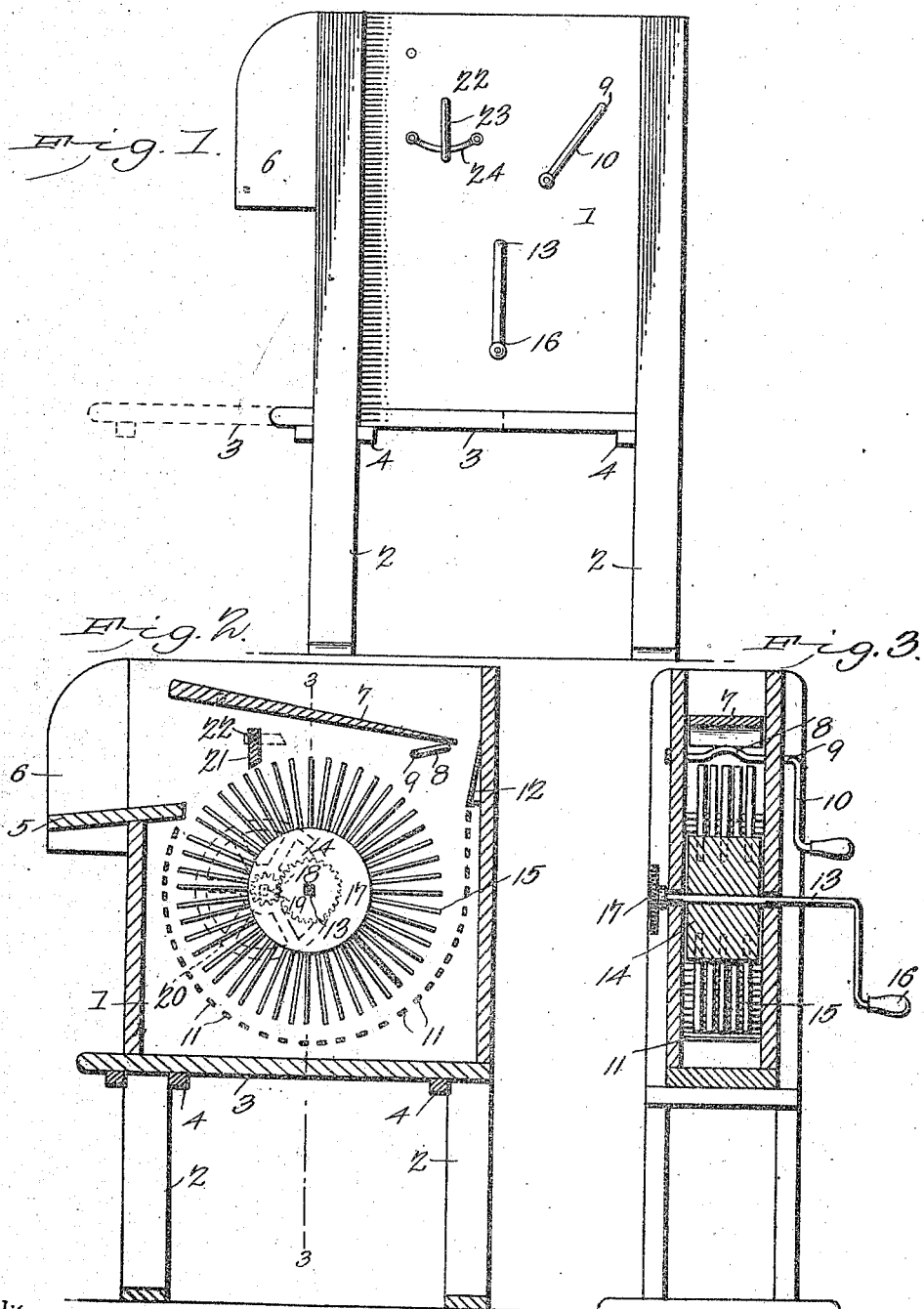

UNITED STATES PATENT OFFICE.

GEORGE F. MAIERS, OF GOLETA, CALIFORNIA.

WALNUT HULLING AND WASHING MACHINE.

SPECIFICATION forming part of Letters Patent No. 733,060, dated July 7, 1903.

Application filed October 23, 1902. Serial No. 128,495. (No model.)

*To all whom it may concern:*

Be it known that I, GEORGE F. MAIERS, a citizen of the United States, residing at Goleta, in the county of Santa Barbara and State of California, have invented a new and useful Walnut Hulling and Washing Machine, of which the following is a specification.

This invention relates to an improved machine for hulling and washing walnuts; and it consists in certain improvements and the construction of the same, to be hereinafter fully described, and particularly pointed out in the claims, reference being had to the accompanying drawings, in which—

Figure 1 is a side elevation of a machine constructed in accordance with the principles of my invention. Fig. 2 is a longitudinal vertical sectional view of the same. Fig. 3 is a vertical transverse sectional view taken on the line 3 3, Fig. 2.

Corresponding parts in the several figures are indicated by similar numerals of reference.

The casing 1 of my improved hulling and washing machine is supported by means of legs 2, secured to the sides of the casing, near the front and rear edges of the same, as shown. Said casing, which is preferably in the form of a narrow rectangular box, is provided with a slidable and removable bottom 3, supported upon cleats 4, connecting the front and the rear legs in pairs, said cleats being disposed transversely, as shown, slightly below the lower edges of the sides of the casing. The casing is provided at the upper front corner thereof with a discharge-chute comprising an inclined board 5 and side pieces 6. Pivotally mounted in the upper part of the casing, near the front end thereof, is a feed-board 7, which is extended toward the rear side of the casing, terminating at a suitable distance from said rear side, so as to admit the passage of unhulled nuts of ordinary size. The free end of the feed-board 7 is supported upon a crank 8, formed upon a shaft 9, which is journaled transversely in the sides of the casing and which is provided at one end with a handle 10, by means of which it may be manipulated so as to agitate the feed-board whenever the nuts shall exhibit a tendency to clog, thus permitting the feed to progress uninterruptedly when the device is in operation.

Within the casing 1 is formed a cage composed of a plurality of transversely-disposed bars 11, preferably made of iron or other suitable metal and square or rectangular in cross-section, so as to present sharp corners. These bars connecting the sides of the casing will coöperate with the latter to form a cage into which the nuts are conducted from the feed-plate 7 by means of a deflector 12, secured to the rear side of the casing. A shaft 13, journaled in the sides of the casing, carries a hub 14, provided with a plurality of radiating flexible teeth 15, which may be constructed of steel rods or wire and which project in the direction of the cage-bars 11. The shaft 13 may be disposed concentrically within the cage, although I prefer, as indicated in Fig. 1, to locate it slightly eccentrically in the direction of the upper front corner of the cage. The bars of the latter are to be placed closely enough together to prevent the passage between them of a hulled walnut. At the receiving end the distance between the cage-bars and the ends or points of the flexible teeth 15 should be sufficient to admit unhulled walnuts of a large size. The teeth 15 are preferably to be placed sufficiently close together to support hulled walnuts upon the points thereof, or, in other words, to prevent the walnuts from entering between said teeth.

The toothed wheel or hub 14 is operated by means of a crank 16 upon one end of the shaft 13. The opposite end of said shaft may be provided with a gear-wheel 17, meshing with a pinion 18, mounted upon a stub-axle 19, which also carries a pulley 20. This pulley when the device is operated by hand acts as a balance-wheel; but it may also be employed to receive motion by means of a belt or band from a suitable source of power, as will be readily understood.

21 designates a deflecting-plate which is pivotally mounted above the toothed wheel and below the feed-plate 7, near the front end of the latter. The shaft 22, upon which said plate is mounted, is provided at one end with a handle 23, adapted to engage a retaining device 24 upon the side of the casing, whereby the said deflecting-plate may be retained either in an approximately vertical or an approximately horizontal position, as will be seen, respectively, in full and in dotted lines in Fig. 2 of the drawings. When this deflecting-plate is in a horizontal position, the nuts will be carried by the revolving toothed wheel past the said plate and back to the inlet of the cage. When the deflecting-plate is in a vertical position, the nuts will be intercepted thereby, and will consequently be discharged over the chute 5.

The operation of this invention will be readily understood. When unhulled nuts are fed into the machine, the hulls will be disintegrated by the joint action of the cage-bars 11 and the spring-teeth 15, the hulls being permitted to escape at the bottom, the bottom plate 3 being temporarily removed. After the nuts have been hulled the bottom plate 3 is placed in position and the box or casing is partially filled with water. The unhulled nuts being now passed through the machine will receive a thorough washing and any particles of the hulls still adhering to them will be removed by this second operation. By feeding only a certain quantity of nuts to the machine at any one time, according to its capacity, the operation may by properly adjusting the deflecting-plate 21 be continued for any desired length of time upon the same batch of nuts until the latter shall be considered to have been sufficiently treated. When, on the other hand, the nuts are in such a condition as to yield readily to treatment, the operation may be continuous.

I have in the foregoing described what I consider to be the preferred construction of my invention; but I desire it to be understood that I do not limit myself with regard to the details of the same, but reserve the right to any structural changes and modifications which may be resorted to without departing from the spirit and scope of my invention or detracting from the utility of the same. Moreover, the utility of the machine is not limited to the treatment of walnuts, inasmuch as by making necessary modifications as to the proportion and relative disposition of the parts it may be used equally well for hulling other nuts, such as are provided with hulls somewhat similar to those of walnuts.

It is obvious that in case the fiber constituting the hulls of the nuts should not be thoroughly removed by the first operation and the subsequent washing, the nuts may, after being dried, again be run through the machine until the adhering fibers are entirely removed and the shells left clean and free from fibers.

Having thus described my invention, what I claim is—

1. In a device of the class described, an approximately segmental cage composed of sharp-cornered transverse bars connecting the sides of the casing, in combination with a hub mounted revolubly within said cage and having flexible teeth extending radially in the direction of the cage-bars, a feed-plate, a deflector directing the discharge from said feed-plate into the cage, and a deflecting-plate mounted pivotally above the discharge end of the cage.

2. In a device of the class described, the combination of a casing, a cage within the same, a flexibly-toothed wheel mounted revolubly in said cage slightly eccentrically with relation thereto, a pivotally-mounted feed-board, a deflector directing the discharge from the latter into the cage, a discharge-chute at the opposite end of the latter, and a pivoted deflecting-plate arranged below the feed-plate and adapted to intercept the material fed between the casing and the toothed wheel and to discharge the same over the discharge-chute.

In testimony that I claim the foregoing as my own I have hereto affixed my signature in the presence of two witnesses.

GEORGE F. MAIERS.

Witnesses:
  GEO. W. RUSSELL,
  GRANT JACKSON.